US012118973B2

(12) United States Patent
Li et al.

(10) Patent No.: US 12,118,973 B2
(45) Date of Patent: Oct. 15, 2024

(54) HELMHOLTZ RESONATOR AND LOW-FREQUENCY BROADBAND SOUND-ABSORBING AND NOISE-REDUCING STRUCTURE BASED ON THE SAME

(71) Applicant: TONGJI UNIVERSITY, Shanghai (CN)

(72) Inventors: Yong Li, Shanghai (CN); Sibo Huang, Shanghai (CN); Zhiling Zhou, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 180 days.

(21) Appl. No.: 17/772,517

(22) PCT Filed: Aug. 31, 2020

(86) PCT No.: PCT/CN2020/112359
§ 371 (c)(1),
(2) Date: Apr. 28, 2022

(87) PCT Pub. No.: WO2021/082706
PCT Pub. Date: May 6, 2021

(65) Prior Publication Data
US 2023/0032437 A1 Feb. 2, 2023

(30) Foreign Application Priority Data
Oct. 29, 2019 (CN) ........................ 201911036388.X

(51) Int. Cl.
*G10K 11/172* (2006.01)
*G10K 11/162* (2006.01)

(52) U.S. Cl.
CPC .......... *G10K 11/172* (2013.01); *G10K 11/162* (2013.01)

(58) Field of Classification Search
CPC ............................ G10K 11/172; G10K 11/162
See application file for complete search history.

(56) References Cited

U.S. PATENT DOCUMENTS 4,106,587 A * 8/1978 Nash ....................... F02K 1/827 181/290
4,231,447 A * 11/1980 Chapman ............. G10K 11/172 181/294

(Continued)

FOREIGN PATENT DOCUMENTS

CN 103700366 Y 4/2014
CN 206489873 A 9/2017

(Continued)

OTHER PUBLICATIONS

Huang, Sibo et al., Broadband Sound Absorbers Using Coupled Helmholtz Resonators with Invaginated Pipes, «Technical Acoustics». Dec. 9, 2017, vol. 36, issue. 6, ISSN 1000-3630, p. 3, CN.

*Primary Examiner* — Forrest M Phillips
(74) *Attorney, Agent, or Firm* — IPRTOP LLC

(57) ABSTRACT

A Helmholtz resonator and a low-frequency broadband sound-absorbing and noise-reducing structure based on the same is provided. The Helmholtz resonator includes a Helmholtz resonator body, at least one embedded tube is disposed in the Helmholtz resonator body, and an inner surface of an opening of the Helmholtz resonator body wraps around an outer side of one of the embedded tubes; and all the embedded tubes are not in contact with each other. The low-frequency broadband sound-absorbing and noise-reducing structure includes a rigid framework, and at least two Helmholtz resonators are disposed in parallel in the framework. The Helmholtz resonator not only achieves a better low-frequency broadband sound absorption and noise reduction effect, but also reduces a thickness of the Helmholtz resonator more effectively. The low-frequency broadband (Continued)

sound-absorbing and noise-reducing structure enhances a sound absorption effect of each weak sound-absorbing Helmholtz resonator, and further achieves more efficient sound absorption.

12 Claims, 10 Drawing Sheets

(56) References Cited

U.S. PATENT DOCUMENTS

| | | | | |
|---|---|---|---|---|
| 2002/0070077 | A1* | 6/2002 | Porte | G10K 11/172 181/290 |
| 2005/0284690 | A1* | 12/2005 | Proscia | G10K 11/172 181/210 |
| 2016/0376952 | A1* | 12/2016 | Sula | F01N 3/04 181/272 |
| 2018/0245515 | A1* | 8/2018 | Roach | B32B 5/245 |
| 2018/0357994 | A1* | 12/2018 | Khelif | G10K 11/04 |

FOREIGN PATENT DOCUMENTS

| | | | | | |
|---|---|---|---|---|---|
| CN | 107563065 X | | | 1/2018 | |
| CN | 208164418 | A | | 11/2018 | |
| CN | 110397505 | | | 11/2019 | |
| CN | 210136718 | | | 3/2020 | |
| CN | 111105774 | | | 5/2020 | |
| CN | 111145709 | A | * | 5/2020 | G10K 11/16 |
| CN | 112509545 | A | * | 3/2021 | G10K 11/172 |
| GB | 2005384 | A | | 4/1979 | |
| JP | 2015079226 X | | | 4/2015 | |
| JP | 2015079226 | Y | | 4/2015 | |
| WO | 2018173638 | A | | 9/2018 | |

* cited by examiner

HELMHOLTZ RESONATOR AND LOW-FREQUENCY BROADBAND SOUND-ABSORBING AND NOISE-REDUCING STRUCTURE BASED ON THE SAME

FIELD OF THE TECHNOLOGY

The present disclosure relates to the field of low-frequency vibration reduction and noise reduction, and in particular, to a Helmholtz resonator and a low-frequency broadband sound-absorbing and noise-reducing structure based on the same.

BACKGROUND

Low-frequency noise has always been the focus and difficulty in noise control engineering. In conventional noise control engineering, an acoustic material can only control noise with a wavelength equal to a size of the material. To reduce the low-frequency noise, a thickness of a sound-absorbing material needs to be at an order of decimeter or even meter. The thickness brings much inconvenience to noise control. Meanwhile, conventional acoustic materials such as a sound-absorbing sponge still have problems such as being unusable at low temperature, and a short service life.

To resolve the problems in the conventional noise control engineering, traditional acoustic perforated plates introduce a resonance characteristic to greatly improve sound absorption characteristics of medium and low frequencies, and are mostly made of aluminum, steel, and other metal materials, which have advantages such as corrosion resistance, low-temperature resistance, affordability on high-speed airflow impact, and suitability for high sound intensity. However, due to the narrowband nature of a resonance structure, neither single-layer nor double-layer micro-perforated plates can meet a noise reduction requirement of a broadband, that is, a sound-absorbing and noise-reducing structure constructed based on a single resonance system only can achieve good sound absorption efficiency at a resonance frequency and a certain adjacent bandwidth, and cannot achieve a wide working frequency band.

To resolve the problem that the working frequency band of sound-absorbing materials is not wide enough, a sound-absorbing bandwidth is mainly broadened by coupling a plurality of single resonance systems currently. In the most commonly used coupling technology at present, a plurality of strong sound-absorbing units with different resonance frequencies are coupled, to form a broadband strong sound-absorbing and noise-reducing structure. This coupling method is direct and basic. However, the above coupling technology ignores a rule of impact of sound-absorbing unit arrangement on sound absorption performance as well as a coupling and enhancement effect caused by different arrangements. The expansion of a sound-absorbing bandwidth of the traditional coupling method mainly depends on the number of sound absorption peaks. Therefore, a large number of sound absorption valleys may exist between a plurality of sound absorption peaks, which results in a loss of efficiency. Meanwhile, the traditional coupling method requires each sound-absorbing unit to have strong sound absorption performance, and the strong sound absorption performance requires the structure to have a specific thickness, which results in a large thickness of the final sound-absorbing and noise-reducing structure. As a result, a lighter and thinner broadband sound-absorbing and noise-reducing structure cannot be achieved.

SUMMARY OF THE PRESENT DISCLOSURE

The technical problem to be resolved by the present disclosure is that a low-frequency broadband sound-absorbing and noise-reducing structure in the traditional noise control engineering has a large thickness, and has a high acoustic impedance design requirement during coupling; meanwhile, the low-frequency broadband sound-absorbing and noise-reducing structure obtained by coupling the traditional single resonators has a larger thickness; moreover, the low-frequency broadband sound-absorbing and noise-reducing structure has a plurality of sound absorption valleys due to the coupling, which seriously affects usage of the broadband sound-absorbing and noise-reducing structure.

The present disclosure provides a Helmholtz resonator, including a Helmholtz resonator body, at least one embedded tube is disposed in the Helmholtz resonator body, and an inner surface of an opening of the Helmholtz resonator body wraps around an outer side of one of the embedded tubes; and all the embedded tubes are not in contact with each other.

Preferably, the Helmholtz resonator body further includes separators used for dividing an inner cavity of the Helmholtz resonator body, and a respective embedded tube penetrates each of the separators.

Preferably, a height of the embedded tube wrapped by the inner surface of the opening of the Helmholtz resonator body is greater than or equal to a thickness of the opening of the Helmholtz resonator body.

Preferably, a height of the embedded tube penetrating the separator is greater than or equal to a thickness of the separator.

The present disclosure further provides a low-frequency broadband sound-absorbing and noise-reducing structure based on a Helmholtz resonator, including a rigid framework, at least two foregoing Helmholtz resonators are disposed in parallel in the framework.

Preferably, a sound absorption efficiency of a main sound absorption frequency of each of the Helmholtz resonators is between 20% and 80%.

Preferably, all the Helmholtz resonators disposed in the framework have a same length.

Preferably, a micro-perforated plate is disposed at a predetermined distance above the Helmholtz resonators disposed in parallel, to achieve serial coupling between the Helmholtz resonators and the micro-perforated plate.

Preferably, the low-frequency broadband sound-absorbing and noise-reducing structure based on a Helmholtz resonator further includes a sound-absorbing sponge layer disposed on upper surfaces of the Helmholtz resonators disposed in parallel and a lower surface of the micro-perforated plate.

Compared with the prior art, one or more embodiments in the foregoing solutions have the following advantages or beneficial effects:

In the Helmholtz resonator provided by the embodiments of the present disclosure, a resonance frequency of the resonator is adjusted by adjusting lengths and cross-sectional areas of embedded tubes in a Helmholtz resonator body and a length and a cross-sectional area of an inner cavity of the Helmholtz resonator body, thereby greatly enhancing acoustic impedance of the Helmholtz resonator and tunability of a sound absorption coefficient, and achieving more free acoustic impedance adjustment at a lower frequency, so that a mutual coupling effect can be adjusted with a higher degree of freedom when Helmholtz resonators are coupled. Meanwhile, based on the rational use of the coupling effect between the resonators, a better low-frequency and broadband sound absorption and noise reduction effect is achieved, and a thickness of the Helmholtz resonator is reduced more effectively. Meanwhile, according to a low-frequency broadband sound-absorbing and noise-reducing structure based on a Helmholtz resonator provided by the embodiments of the present disclosure, serial coupling or serial-parallel coupling is performed on Helmholtz resonators, thereby enhancing a sound absorption effect of each Helmholtz resonator in the low-frequency broadband sound-absorbing and noise-reducing structure, and further achieving more efficient sound absorption by using a thinner low-frequency broadband sound-absorbing and noise-reducing structure in a larger broadband range.

Other features and advantages of the present disclosure will be described in the subsequent specification, and partially become apparent from the specification, or be understood by implementing the present disclosure. Objectives and other advantages of the present disclosure may be implemented and obtained by using structures particularly mentioned in the specification, the claims, and the accompanying drawings.

BRIEF DESCRIPTION OF THE DRAWINGS

The drawings are used to provide a further understanding of the present disclosure, and constitute a part of the specification, are used to explain the present disclosure in combination with the embodiments of the present disclosure, and do not constitute a limitation to the present disclosure. In the drawings.

Figure 1:
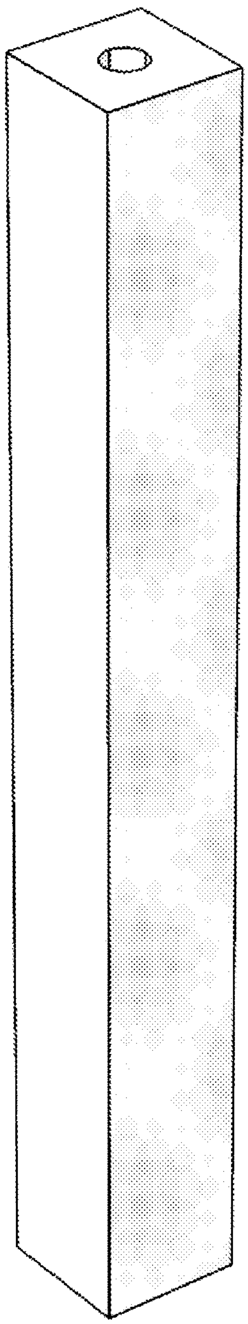
FIG. 1 is a schematic structural diagram of a Helmholtz resonator according to an embodiment of the present disclosure.

In the drawings, 1 denotes a Helmholtz resonator body, 2 denotes an opening embedded tube, 3 denotes a separator, and 4 denotes an internal embedded tube.

DETAILED DESCRIPTION OF THE PREFERRED EMBODIMENTS

The implementation of the present disclosure will be described in detail with the accompanying drawings and embodiments, to fully understand and implement an implementation process of how the present disclosure applies technical means to solve technical problems and achieve technical effects. It should be noted that, if no conflict occurs, embodiments of the present disclosure and features in the embodiments may be combined with each other, and the formed technical solutions fall within the protection scope of the present disclosure.

Low-frequency noise has always been the focus and difficulty in noise control engineering. To resolve the problems in the conventional noise control engineering, traditional acoustic perforated plates introduce a resonance characteristic to greatly improve sound absorption characteristics of medium and low frequencies. However, due to a narrow narrow-band of a resonance structure, neither single-degree-of-freedom nor double-degree-of-freedom micro-perforated plates can meet a noise reduction requirement of a broadband or achieve a wide working frequency band. To resolve the problem that the working frequency band of sound-absorbing materials is not wide enough, a sound-absorbing bandwidth is mainly broadened by coupling a plurality of single resonance systems currently. In the most commonly used coupling technology at present, a plurality of strong sound-absorbing units with different resonance frequencies are coupled, to form a broadband strong sound-absorbing and noise-reducing structure. This coupling method is direct and basic. However, the above coupling technology ignores a rule of impact of sound-absorbing unit arrangement on sound absorption performance as well as a coupling and enhancement effect caused by different arrangements. The expansion of a sound-absorbing bandwidth of the traditional coupling method mainly depends on the number of sound absorption peaks. Therefore, a large number of sound absorption valleys may exist between a plurality of sound absorption peaks, which results in a loss of efficiency. Meanwhile, the traditional coupling method requires each sound-absorbing unit to have strong sound absorption performance. Therefore, there are also specific requirements on the structure, and a lighter and thinner broadband sound-absorbing and noise-reducing structure still cannot be achieved.

Embodiment 1

To resolve the technical problems in the prior art, an embodiment of the present disclosure provides a Helmholtz resonator.

Figure 2:
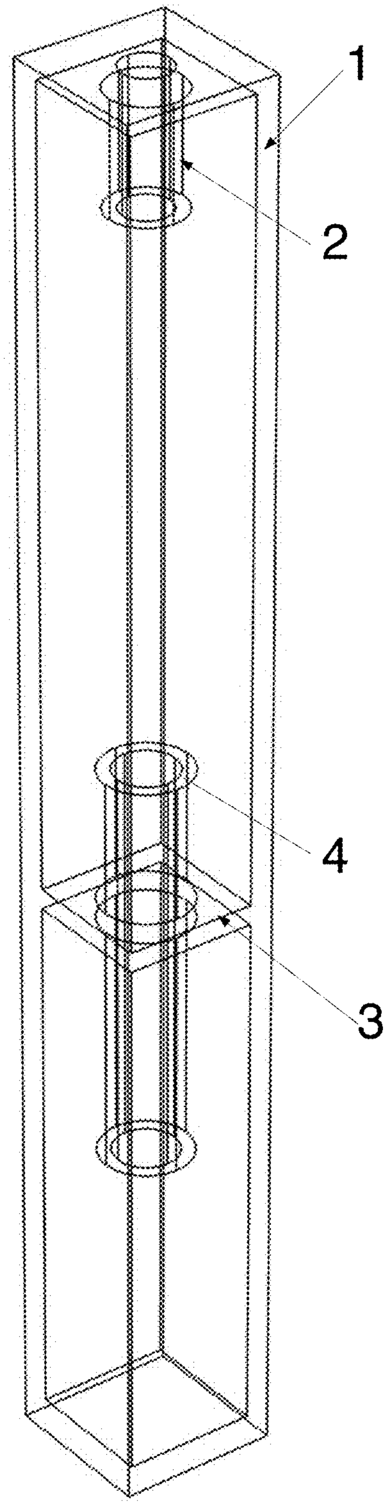
FIG. 2 is a schematic diagram of an internal structure of a Helmholtz resonator according to an embodiment of the present disclosure.

FIG. 1 is a schematic structural diagram of a Helmholtz resonator according to an embodiment of the present disclosure. FIG. 2 is a schematic diagram of an internal structure of a Helmholtz resonator according to an embodiment of the present disclosure. Referring to FIG. 1 and FIG. 2, the Helmholtz resonator of this embodiment of the present disclosure includes a Helmholtz resonator body 1, at least one embedded tube is disposed in the Helmholtz resonator body 1, and an inner surface of an opening of the Helmholtz resonator body wraps around an outer side of one of the embedded tubes.

The embedded tube wrapped by the inner surface of the opening of the Helmholtz resonator body is set as an opening embedded tube 2, and the Helmholtz resonator body 1 at least includes the opening embedded tube 2. It should be noted that, all the embedded tubes (including the opening of the Helmholtz resonator) are located inside the Helmholtz resonator. The inner surface of the opening of the Helmholtz resonator body wraps around an outer side of a top end of the opening embedded tube 2, and a height of the embedded tube at the opening may extend at most from the opening of the Helmholtz resonator body into an inner cavity of the Helmholtz resonator body 1. It should be further noted that, all the embedded tubes are not in contact with each other.

Preferably, the Helmholtz resonator body 1 may include a hollow rectangular column, an upper surface of the rectangular column includes an opening in communication with the inner cavity, and the opening is used as the opening of the Helmholtz resonator body 1. Preferably, the opening of the Helmholtz resonator body is circular, and the opening embedded tube 2 is correspondingly a hollow cylindrical tube.

It should be noted that, the Helmholtz resonator body 1 may alternatively be a hollow cylinder with another cross-sectional area, for example, a cylinder or polygonal prism. Further preferably, the opening of the Helmholtz resonator body may alternatively be set as an opening in another shape, for example, a square opening or a polygonal opening, and a shape of the opening embedded tube 2 may be set corresponding to the opening of the Helmholtz resonator body.

One or more separators 3 may be disposed in the Helmholtz resonator body 1, and a purpose of setting the separators 3 is to divide the inner cavity of the Helmholtz resonator body 1 into a plurality of chambers. A respective embedded tube is disposed on each of the separators 3, embedded tubes disposed on the separators 3 are set as internal embedded tubes 4, and each of the internal embedded tubes 4 penetrates each of the separators 3. Preferably, the internal embedded tube 4 may be set as a hollow cylindrical tube. It should be noted that, the internal embedded tube 4 may alternatively be set as a column-shaped tube with a square or polygonal cross section. The internal embedded tube 4 may extend upward and/or downward from the separator into upper and lower chambers divided by the internal embedded tube 4.

To make the designed Helmholtz resonator suitable for various low-frequency sound-absorbing and noise-reducing structures, the number of separators 3 of the Helmholtz resonator, the embedded tubes, and the inner cavity of the Helmholtz resonator may be adjusted to obtain various Helmholtz resonators with different parameters. Further, the height of the opening embedded tube 2 is set to be greater than or equal to a thickness of the opening of the Helmholtz resonator body, and a height of the internal embedded tube 4 is set to be greater than or equal to a thickness of the separator, so that adjustment of the opening embedded tube 2 and the internal embedded tube 4 basically exists when the embedded tubes are adjusted.

In actual applications, the user may adjust lengths and diameters of the embedded tubes in the Helmholtz resonator body 1, a length, a width, and a height of the inner cavity of the Helmholtz resonator body 1, and positions of the separators in the body 1 according to a target frequency to be achieved. It should be noted that, when no separator 3 is disposed in the Helmholtz resonator body 1, the Helmholtz resonator is a single-layer structure; and when one separator 3 is disposed in the Helmholtz resonator body 1, the separator 3 divides the Helmholtz resonator into a two-layer structure, and so on. The Helmholtz resonator may be divided into a multi-layer structure based on the target frequency. When sizes of the embedded tubes and the inner cavity of Helmholtz resonator body 1 are adjusted, embedded tubes and chambers in the multi-layer structure may be respectively adjusted.

To better describe the acoustic impedance design of the Helmholtz resonator according to this embodiment of the present disclosure, a Helmholtz resonator without a separator is taken as an example to calculate the impedance of the Helmholtz resonator.

Figure 3:
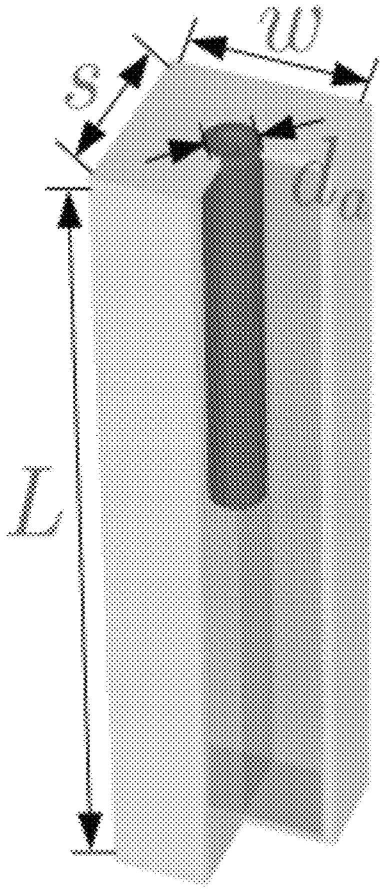
FIG. 3 is a schematic diagram of a cross-sectional structure of an example of a Helmholtz resonator according to an embodiment of the present disclosure.
Figure 4:
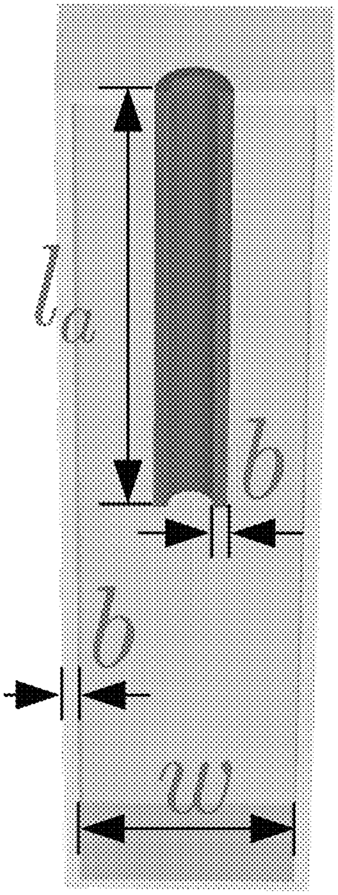
FIG. 4 is a schematic diagram of another cross-sectional structure of the Helmholtz resonator shown in FIG. 3.

FIG. 3 is a schematic diagram of a cross-sectional structure of an example of a Helmholtz resonator according to an embodiment of the present disclosure. FIG. 4 is a schematic diagram of another cross-sectional structure of the Helmholtz resonator shown in FIG. 3. Referring to FIG. 3 and FIG. 4, w, s, and L are a length, a width, and a height of the exemplary Helmholtz resonator respectively, and b is a wall thickness of the Helmholtz resonator or a wall thickness of a solid material used by an opening embedded tube 2. Only the opening embedded tube 2 exists in the exemplary Helmholtz resonator, wherein a height of the opening embedded tube 2 is $l_a$, and a diameter of the opening embedded tube 2 is $d_a$; and impedance Z of the exemplary Helmholtz resonator may be represented as the following.

$$Z = \frac{A}{S_a}\left[-\rho_0 c_0 \frac{2j\sin(k_{ca} l_a/2)}{\sqrt{(\gamma-(\gamma-1)\Psi_{ha})\Psi_{va}}} + \sqrt{2\omega\rho_0\eta}\right] + \frac{A}{S_a}\left[j\omega\rho_0\delta_\Omega - \frac{jS_a\rho_{cc}c_{cc}\tau_\Omega}{S_c}\cot(k_{cc}L)\right] \tag{1}$$

In formula (1), j is an imaginary unit, $\rho_0$ is static density of air, and $c_0$ is a speed of sound in static air; $\gamma$ is a specific heat ratio of air, $S_c$ is a cross-sectional area of an inner cavity of the exemplary Helmholtz resonator, $\psi_{ha}$ and $\psi_{va}$ are heat conduction and viscosity fields in the embedded tube and are functions of the diameter $d_a$ of the embedded tube; $k_{ca}$ is an equivalent wavenumber in the embedded tube; $\rho_{cc}$, $c_{cc}$, and $k_{cc}$ are respectively equivalent air density, an equivalent speed of sound, and an equivalent wavenumber in the inner cavity of the Helmholtz resonator; $\eta$ is an air viscosity coefficient; $\delta_\Omega$ is a correction coefficient of radiation resistance of the embedded tube; and $T_\Omega$ is a correction coefficient of acoustic reactance of an inner cavity in the embedded tube, $S_a$=pi*da^2 is a cross-sectional area of the embedded tube, and A is a cross-sectional area of the Helmholtz resonator, wherein b is a wall thickness of a solid material used by the Helmholtz resonator, which depends on actual machining process accuracy and may be set according to an actual situation.

It can be seen from formula (1) that, the acoustic impedance design of the exemplary Helmholtz resonator is flexible by introducing the embedded tubes. When there are one or more separators in the Helmholtz resonator, the Helmholtz resonator may be considered to be connected in series. The serial connection manner is implemented based on the formula (1), to obtain acoustic impedance of a Helmholtz resonator with multiple layers of separators.

According to a Helmholtz resonator provided by the embodiments of the present disclosure, a resonance frequency of the resonator is adjusted by adjusting lengths and cross-sectional areas of embedded tubes in of a Helmholtz resonator body and a length and a cross-sectional area of an inner cavity of the Helmholtz resonator body, thereby greatly enhancing acoustic impedance of the Helmholtz resonator and tunability of a sound absorption coefficient, and achieving more free acoustic impedance adjustment at a lower frequency, so that a mutual coupling effect can be adjusted with a higher degree of freedom when Helmholtz resonators are coupled. Meanwhile, based on rational use of the coupling effect between the resonators, a better low-frequency and broadband sound absorption and noise reduction effect is achieved, and a thickness of the Helmholtz resonator is reduced more effectively.

Embodiment 2

To resolve the technical problems in the prior art, an embodiment of the present disclosure provides a low-frequency broadband sound-absorbing and noise-reducing structure based on a Helmholtz resonator.

Figure 5:
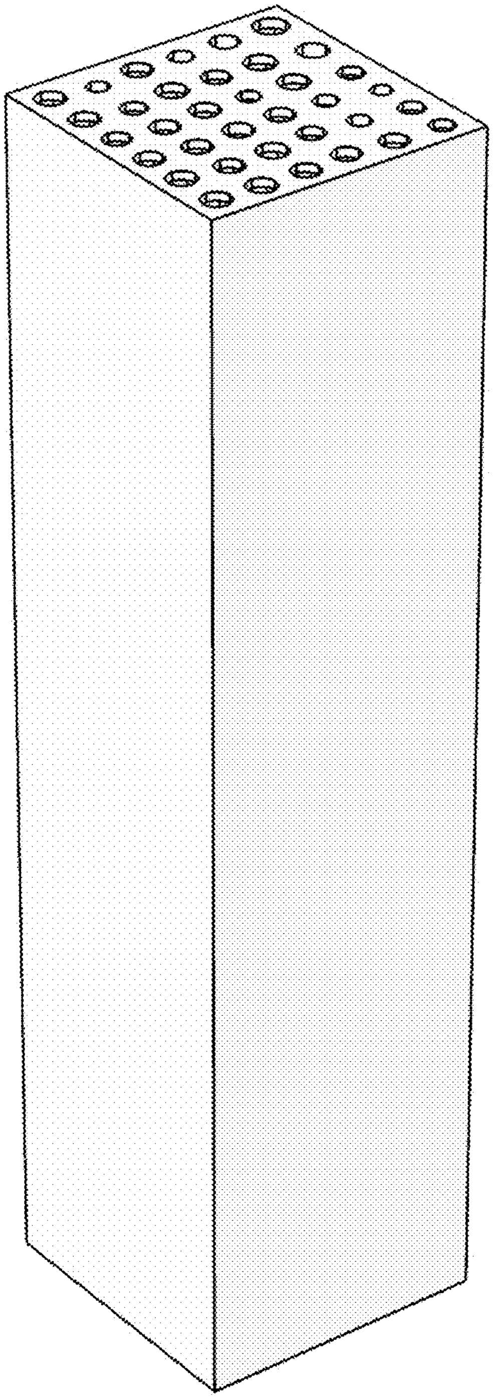
FIG. 5 is a schematic structural diagram of a low-frequency broadband sound-absorbing and noise-reducing structure based on coupled Helmholtz resonators according to Embodiment 2 of the present disclosure.
Figure 6:
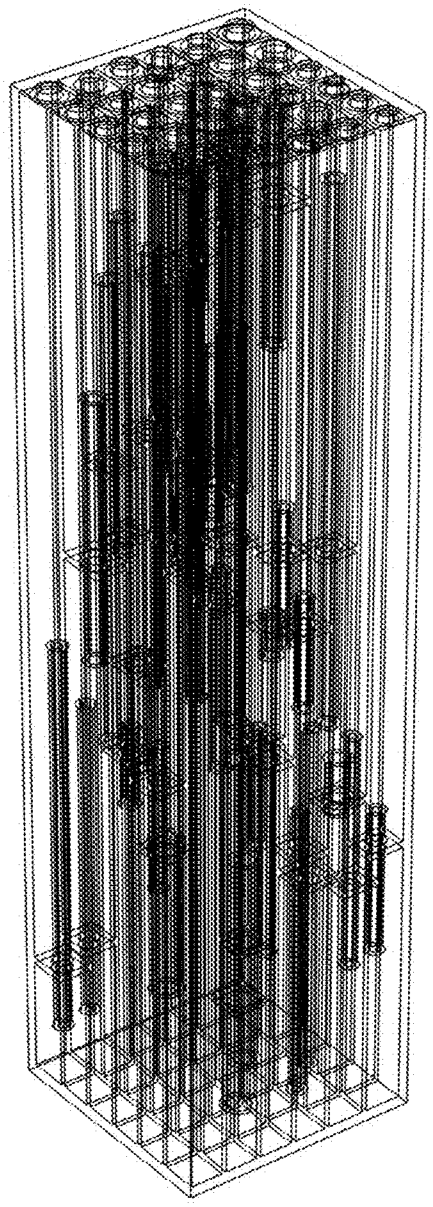
FIG. 6 is a schematic diagram of an internal structure of a low-frequency broadband sound-absorbing and noise-reducing structure based on coupled Helmholtz resonators according to Embodiment 2 of the present disclosure.

FIG. 5 is a schematic structural diagram of a low-frequency broadband sound-absorbing and noise-reducing structure based on a Helmholtz resonator according to Embodiment 2 of the present disclosure. FIG. 6 is a schematic diagram of an internal structure of a low-frequency broadband sound-absorbing and noise-reducing structure based on a Helmholtz resonator according to Embodiment 2 of the present disclosure. Referring to FIG. 5 and FIG. 6, the low-frequency broadband sound-absorbing and noise-reducing structure based on a Helmholtz resonator according to this embodiment of the present disclosure includes a rigid framework and a plurality of Helmholtz resonators disposed in the rigid framework.

The plurality of Helmholtz resonators is arranged in parallel in the rigid framework, so that the plurality of Helmholtz resonators is coupled in parallel. Further, all the Helmholtz resonators in the framework have a same length, and sound absorption efficiencies of main sound absorption frequencies of all the Helmholtz resonators in the framework are between 20% and 80%.

Figure 7:
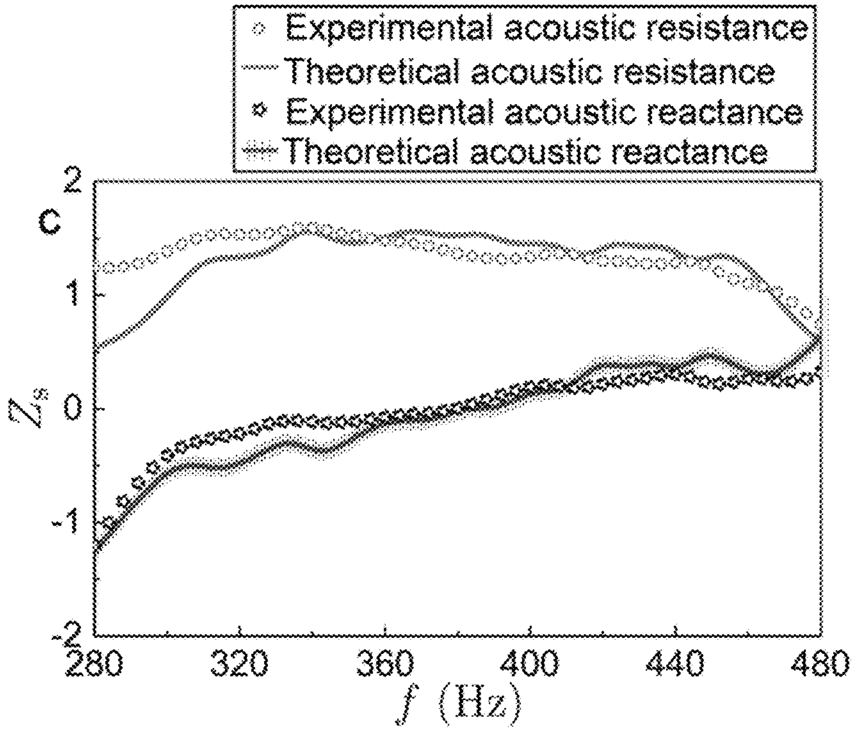
FIG. 7 is a schematic diagram of analyzing acoustic impedance of a parallel-coupled low-frequency broadband sound-absorbing and noise-reducing structure based on coupled Helmholtz resonators according to Embodiment 2 of the present disclosure.
Figure 8:
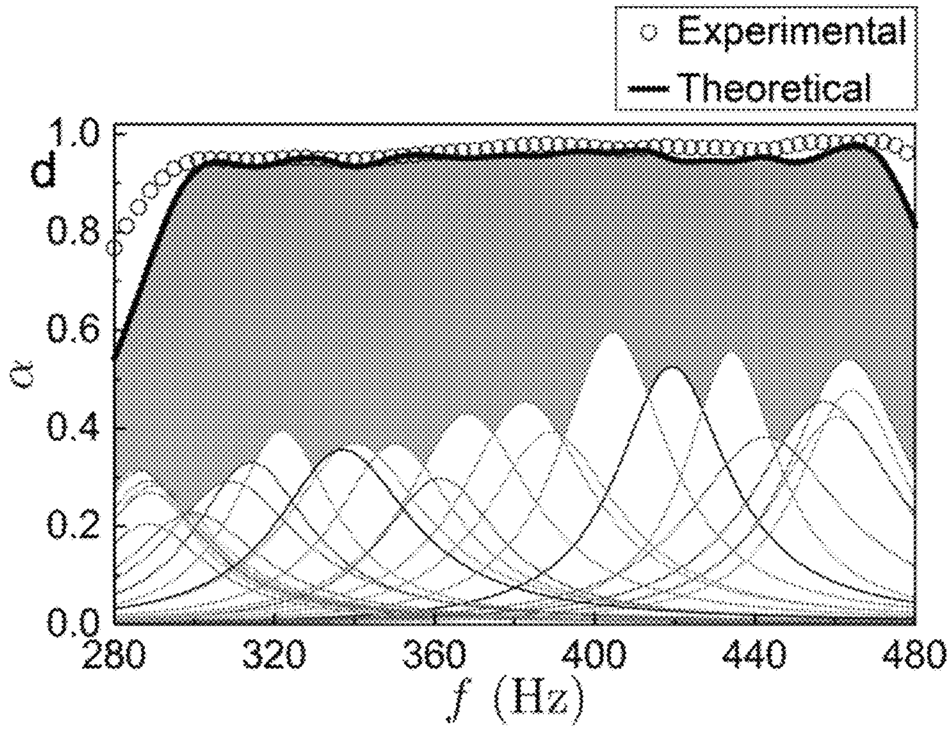
FIG. 8 is a schematic diagram of the sound absorption coefficients of a parallel-coupled low-frequency broadband sound-absorbing and noise-reducing structure based on coupled Helmholtz resonators according to Embodiment 2 of the present disclosure.

To better describe a structure of the low-frequency broadband sound-absorbing and noise-reducing structure based on a Helmholtz resonator according to this embodiment of the present disclosure, the following characterizes impedance adjustment and sound absorption performance thereof by using an example in which 25 single-layer weak sound-absorbing Helmholtz resonators are coupled in parallel. FIG. 7 is a schematic diagram of analyzing acoustic impedance of a parallel-coupled low-frequency broadband sound-absorbing and noise-reducing structure based on a Helmholtz resonator according to Embodiment 2 of the present disclosure. The 25 single-layer weak sound-absorbing Helmholtz resonators are connected in parallel in the low-frequency broadband sound-absorbing and noise-reducing structure. Therefore, parallel connection is implemented based on the formula (1), and acoustic impedance $$Z = 1/\sum_{n=1}^{n} Z_n^{-1}.$$

of the low-frequency broadband sound-absorbing and noise-reducing structure may be obtained, wherein $Z_n$ represents impedance of the 25 weak sound-absorbing Helmholtz resonators, and n=1 to 25. It can be seen from FIG. 7 that, a curve of acoustic resistance of the parallel-coupled low-frequency broadband sound-absorbing and noise-reducing structure is close to 1, and a curve of acoustic reactance is close to 0. FIG. 8 is a schematic diagram of a sound absorption coefficient of a parallel-coupled low-frequency broadband sound-absorbing and noise-reducing structure based on a Helmholtz resonator according to Embodiment 2 of the present disclosure. It can be seen from FIG. 8 that, although sound absorption coefficients of the 25 weak sound-absorbing Helmholtz resonators that form the low-frequency broadband sound-absorbing and noise-reducing structure in a designed frequency band range (297 Hz to 479 Hz) are less than 1, the sound absorption coefficient of the low-frequency broadband sound-absorbing and noise-reducing structure in the designed sound absorption frequency range (297 Hz to 479 Hz) is close to 1. A thickness of the low-frequency broadband sound-absorbing and noise-reducing structure corresponding to FIG. 7 and FIG. 8 is 5 cm.

Figure 9:
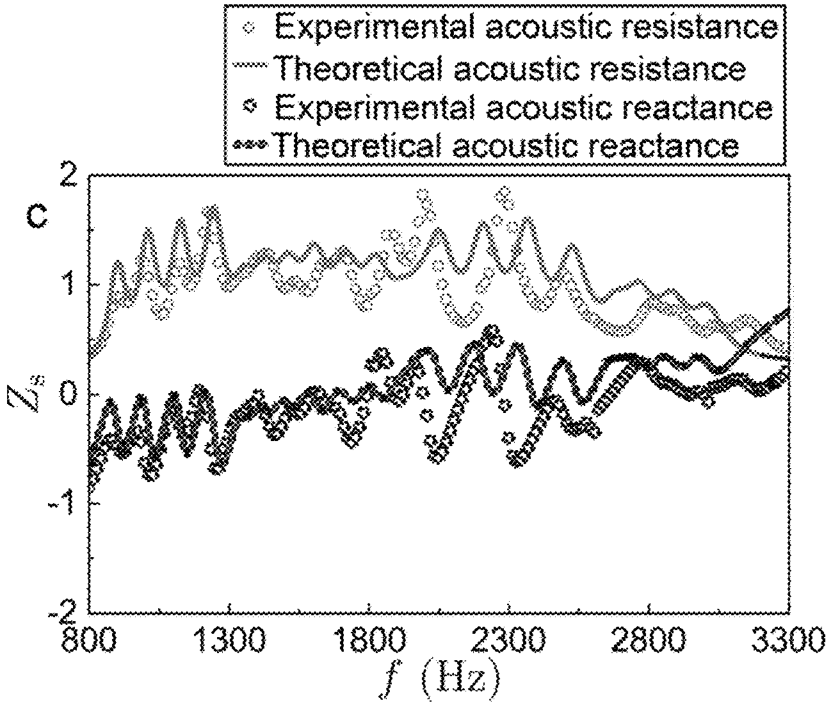
FIG. 9 is a schematic diagram of analyzing acoustic impedance of a serial-parallel-coupled low-frequency broadband sound-absorbing and noise-reducing structure based on coupled Helmholtz resonators and a perforated panel according to Embodiment 2 of the present disclosure.
Figure 10:
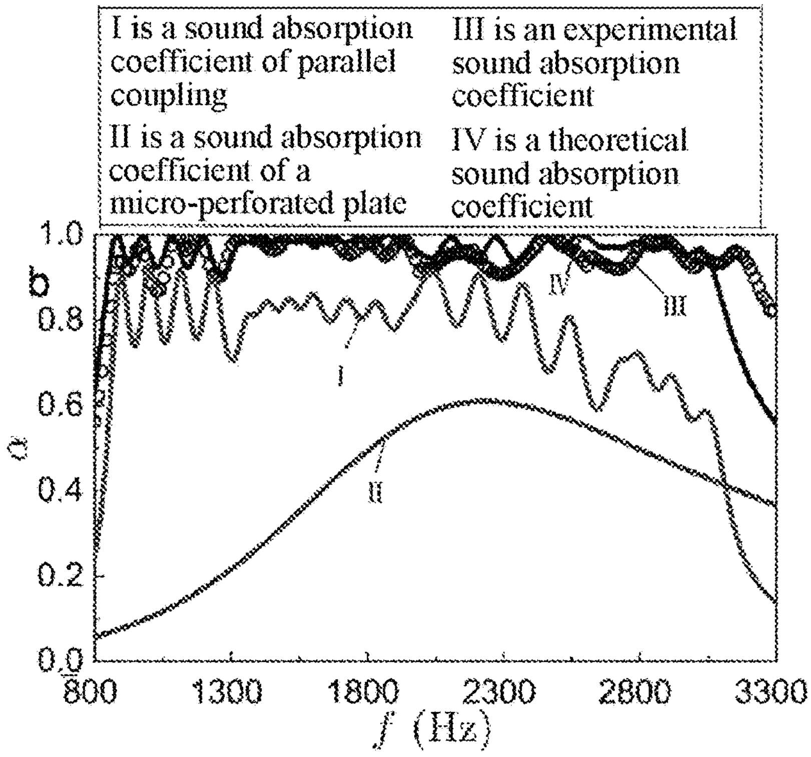
FIG. 10 is a schematic diagram of the sound absorption coefficients of a serial-parallel-coupled low-frequency broadband sound-absorbing and noise-reducing structure based on coupled Helmholtz resonators and a perforated panel according to Embodiment 2 of the present disclosure.

Further, a micro-perforated plate is further disposed at a predetermined distance above the Helmholtz resonators disposed in parallel, to achieve serial coupling between the Helmholtz resonators and the micro-perforated plate. More coupling types provide more flexible coupling adjustment, making it possible to design sound-absorbing and noise-reducing structures in a larger broadband range. FIG. 9 is a schematic diagram of analyzing acoustic impedance of a serial-parallel-coupled low-frequency broadband sound-absorbing and noise-reducing structure based on a Helmholtz resonator according to Embodiment 2 of the present disclosure. It can be seen from FIG. 9 that, a curve of acoustic resistance of the serial-parallel-coupled low-frequency broadband sound-absorbing and noise-reducing structure in a designed frequency range (870 Hz to 3224 Hz) is close to 1, and a curve of acoustic reactance is close to 0. FIG. 10 is a schematic diagram of a sound absorption coefficient of a serial-parallel-coupled low-frequency broadband sound-absorbing and noise-reducing structure based on a Helmholtz resonator according to Embodiment 2 of the present disclosure. It can be seen from FIG. 10 that, in the designed frequency range (870 Hz to 3224 Hz), by comparing a curve of the sound absorption coefficient of the serial-parallel-coupled low-frequency broadband sound-absorbing and noise-reducing structure used alone and a curve of a sound absorption coefficient of the micro-perforated plate used alone under the same conditions, the curve of the sound absorption coefficient of the serial-parallel-coupled low-frequency broadband sound-absorbing and noise-reducing structure is closer to 1, and is also more gentle. A thickness of the low-frequency broadband sound-absorbing and noise-reducing structure corresponding to FIG. 9 and FIG. 10 is 3.9 cm.

Figure 11:
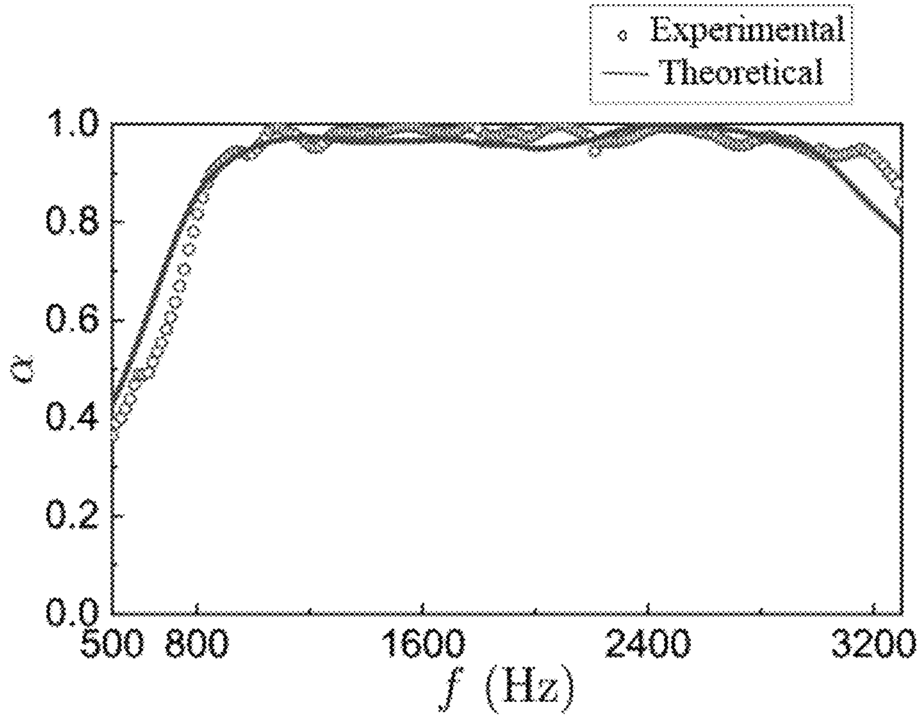
FIG. 11 is a schematic diagram of the sound absorption coefficients of a serial-parallel-coupled low-frequency broadband sound-absorbing and noise-reducing structure based on coupled Helmholtz resonators with an added sound-absorbing sponge according to Embodiment 2 of the present disclosure.

Further, a sound-absorbing sponge layer may be disposed on upper surfaces of the Helmholtz resonators disposed in parallel and a lower surface of the micro-perforated plate respectively. The setting of the sound-absorbing sponge layer improves a loss characteristic of the sound-absorbing and noise-reducing structure system, and can achieve a sound absorption effect with a higher average sound absorption coefficient without reducing a sound absorption frequency band or increasing a thickness. FIG. 11 is a schematic diagram of a sound absorption coefficient of a serial-parallel-coupled low-frequency broadband sound-absorbing and noise-reducing structure based on a Helmholtz resonator with an added sound-absorbing sponge according to Embodiment 2 of the present disclosure. By comparing FIG. 10 with FIG. 11, it can be seen that a curve of the sound absorption coefficient of a serial-parallel-coupled low-frequency broadband sound-absorbing and noise-reducing structure after the sound-absorbing sponge is added is closer to 1, and is more gentle.

Figure 12:
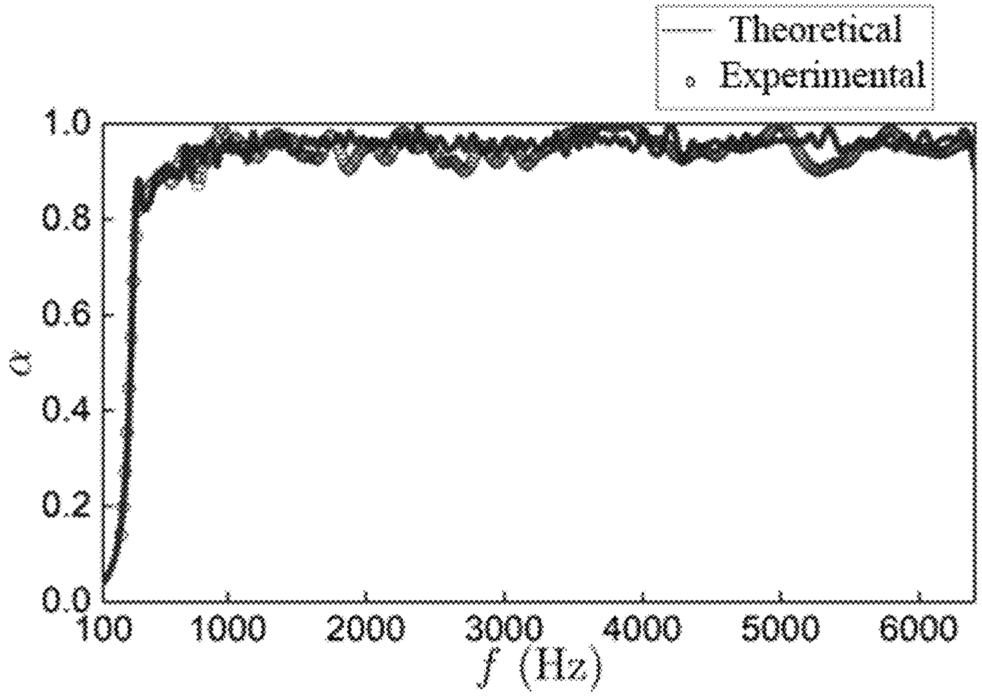
FIG. 12 is a schematic structural diagram of a multi-degree-of-freedom-coupled low-frequency broadband sound-absorbing and noise-reducing structure based on coupled Helmholtz resonators according to Embodiment 2 of the present disclosure.
Figure 13:
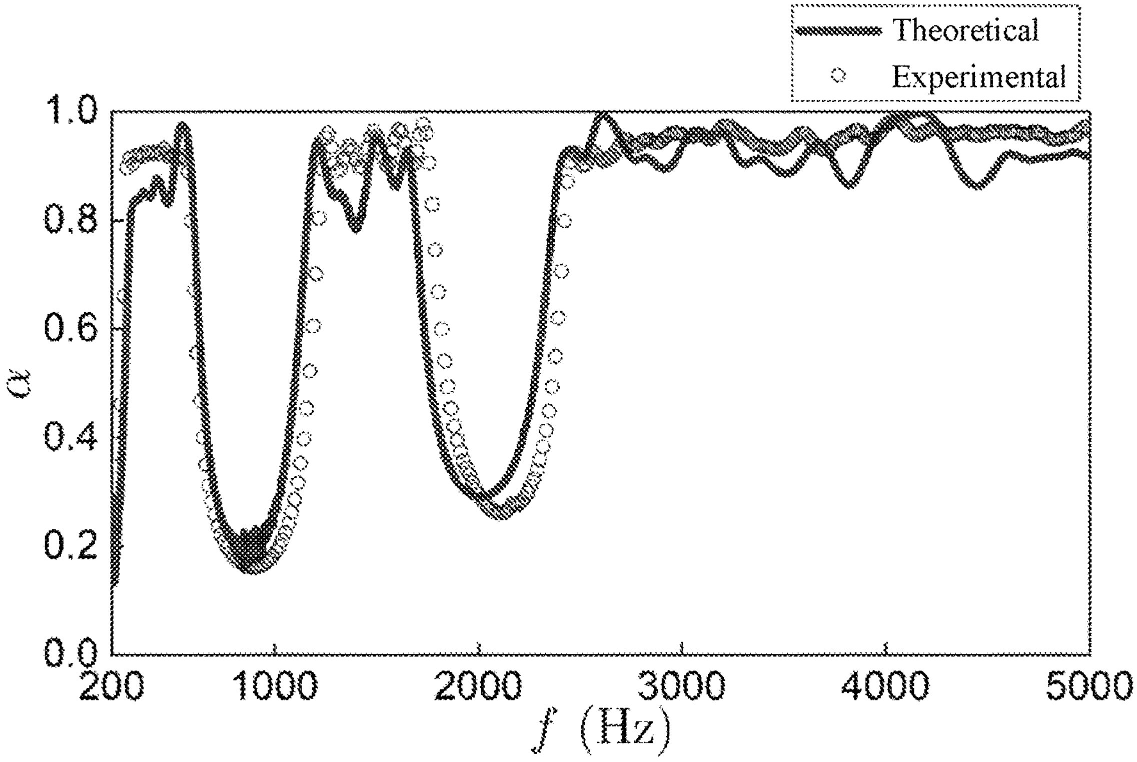
FIG. 13 is a schematic diagram of a sound absorption coefficient of a multi-degree-of-freedom-coupled low-frequency broadband sound-absorbing and noise-reducing structure based on coupled weak sound-absorbing Helmholtz resonators in a sound absorption frequency band according to Embodiment 2 of the present disclosure.

Specifically, it can be seen from results of FIGS. 7-11 that coupling effect adjustment with a higher degree of freedom can achieve sound absorption design in a broader frequency band and higher sound absorption efficiency. Therefore, the degree of freedom of a coupling effect will be further increased. Specifically, more parameters of all weak sound-absorbing Helmholtz resonators disposed in parallel in the framework may be adjusted, including a position of a separator in an inner cavity in each of the weak sound-absorbing Helmholtz resonators, a cross-sectional area and a height of an opening embedded tube 2, a cross-sectional area of an internal embedded tube and respective lengths of the internal embedded tube in upper and lower chambers divided by the separator, a length and a width of an inner cavity of the Helmholtz resonator, etc. Coupling effect adjustment with a higher degree of freedom can achieve sound absorption design in a broader frequency band and higher sound absorption efficiency. FIG. 5 and FIG. 6 are schematic structural diagrams of a multi-degree-of-freedom-coupled low-frequency broadband sound-absorbing structure based on a weak sound-absorbing Helmholtz resonator according to Embodiment 2 of the present disclosure. FIG. 12 is a schematic structural diagram of a multi-degree-of-freedom-coupled low-frequency broadband sound-absorbing and noise-reducing structure based on a Helmholtz resonator according to Embodiment 2 of the present disclosure. It can be seen that, the multi-degree-of-freedom-coupled low-frequency broadband sound-absorbing structure can achieve an efficient sound absorption characteristic in a frequency range of 300 Hz to 6400 Hz, and an average sound absorption coefficient in the frequency range can reach 0.93. A thickness of a sound-absorbing structure corresponding to a sound absorption curve shown in FIG. 12 is only 10 cm. In addition to achieving an efficient sound absorption coefficient in a designated broadband range, the multi-degree-of-freedom-coupled sound-absorbing structure further presents high tunability of the sound absorption coefficient. FIG. 13 is a schematic structural diagram of a sound absorption coefficient of a multi-degree-of-freedom-coupled low-frequency broadband sound-absorbing and noise-reducing structure based on a weak sound-absorbing Helmholtz resonator in a sound absorption frequency band according to Embodiment 2 of the present disclosure. It can be seen from FIG. 13 that, through rational use of multi-degree-of-freedom serial-parallel coupling, the low-frequency broadband sound-absorbing structure in Embodiment 2 of the present disclosure can achieve the efficient sound absorption characteristic in frequency ranges of 285 Hz to 600 Hz, 1200 Hz to 1800 Hz, and 2400 Hz to 5000 Hz, and achieve a lower sound absorption coefficient in frequency ranges of 600 Hz to 1200 Hz and 1800 Hz to 2400 Hz. The results show that the multi-degree-of-freedom serial-parallel coupling can greatly improve acoustic impedance and tunability of the sound absorption coefficient.

Through a low-frequency broadband sound-absorbing structure based on a weak sound-absorbing Helmholtz resonator with embedded tubes and multiple layers of separators provided by the embodiments of the present disclosure, weak sound-absorbing Helmholtz resonators are coupled in parallel or coupled in series and parallel, to achieve an efficient sound absorption characteristic in a low-frequency broadband. Particularly, different from a design concept of a conventional broadband sound-absorbing structure, the weak sound-absorbing Helmholtz resonators are used. Therefore, compared with the conventional broadband sound-absorbing structure, the designed sound-absorbing structure has advantages of a more efficient sound absorption characteristic and a lighter structure. Actual requirements for sound absorption and noise reduction are usually concentrated in different frequency bands, but through the design concept provided by the embodiments of the present disclosure, a light low-frequency broadband sound-absorbing and noise-reducing structure can be achieved for a required sound absorption frequency range.

Although the implementations disclosed in the present disclosure are described above, the content of the implementations is only used to facilitate the understanding of the present disclosure, and is not intended to limit the present disclosure. Any person skilled in the art of the present disclosure can make any modification and change in the form and details of the implementations without departing from the spirit and scope of the present disclosure. However, the protection scope of the present disclosure should still be subject to the scope defined by the appended claims.

What is claimed is:

1. A Helmholtz resonator, comprising a Helmholtz resonator body, wherein one or more embedded tubes are disposed in the Helmholtz resonator body, and an inner surface of an opening of the Helmholtz resonator body wraps around an outer side of one of the embedded tubes;

the Helmholtz resonator body comprises separators used for dividing an inner cavity of the Helmholtz resonator body, and a respective embedded tube penetrates each of the separators, and all the embedded tubes are not in contact with each other.

2. The Helmholtz resonator as in claim 1, wherein a height of the embedded tube wrapped by the inner surface of the opening of the Helmholtz resonator body is greater than or equal to a thickness of the opening of the Helmholtz resonator body.

3. The Helmholtz resonator as in claim 1, wherein a height of the embedded tube penetrating the separator is greater than or equal to a thickness of the separator.

4. A low-frequency broadband sound-absorbing and noise-reducing structure based on a Helmholtz resonator, comprising a rigid framework, wherein at least two Helmholtz resonators as in any one of claims 1 to 3 are disposed in parallel in the framework.

5. The low-frequency broadband sound-absorbing and noise-reducing structure as in claim 4, wherein a sound absorption efficiency of a main sound absorption frequency of each of the Helmholtz resonators is between 20% and 80%.

6. The low-frequency broadband sound-absorbing and noise-reducing structure as in claim 5, wherein all the Helmholtz resonators disposed in the framework have a same length.

7. The low-frequency broadband sound-absorbing and noise-reducing structure as in claim 6, wherein a micro-perforated plate is disposed at a predetermined distance above the Helmholtz resonators disposed in parallel, to achieve serial coupling between the Helmholtz resonators and the micro-perforated plate.

8. The low-frequency broadband sound-absorbing and noise-reducing structure as in claim 7, further comprising a sound-absorbing sponge layer disposed on upper surfaces of the Helmholtz resonators disposed in parallel and a lower surface of the micro-perforated plate.

9. The Helmholtz resonator as in claim 1, wherein a quantity of the embedded tubes is two or more, and a quantity of the separators is two or more.

10. The Helmholtz resonator as in claim 1, wherein the embedded tubes extend along a length direction of the Helmholtz resonator body, and are spaced apart along the length direction of the Helmholtz resonator body.

11. The Helmholtz resonator as in claim 1, wherein each of the separators divides the Helmholtz resonator body into an upper chamber and a lower chamber.

12. The low-frequency broadband sound-absorbing and noise-reducing structure as in claim 4, wherein for at least two of the Helmholtz resonators, their separators have different heights relative to a bottom of the low-frequency broadband sound-absorbing and noise-reducing structure.

* * * * *